US009367500B2

(12) United States Patent
Guok et al.

(10) Patent No.: US 9,367,500 B2
(45) Date of Patent: Jun. 14, 2016

(54) APPARATUS FOR MULTIPLE BUS MASTER ENGINES TO SHARE THE SAME REQUEST CHANNEL TO A PIPELINED BACKBONE

(75) Inventors: Ngek Leong Guok, Sitiawan (MY); Kah Meng Yeem, Folsom, CA (US); Poh Thiam Teoh, Seri Damansara (MY); Jennifer Chin, Sungai Ara (MY); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 13/997,623

(22) PCT Filed: Nov. 9, 2011

(86) PCT No.: PCT/US2011/006018
§ 371 (c)(1),
(2), (4) Date: Jun. 24, 2013

(87) PCT Pub. No.: WO2013/070215
PCT Pub. Date: May 16, 2013

(65) Prior Publication Data
US 2014/0207986 A1 Jul. 24, 2014

(51) Int. Cl.
*G06F 13/364* (2006.01)
*H04L 12/28* (2006.01)
(52) U.S. Cl.
CPC .............. *G06F 13/364* (2013.01); *H04L 12/28* (2013.01)
(58) Field of Classification Search
CPC ........ G06F 13/364; G06F 13/36; H04L 12/28
USPC ......................................... 710/110, 113, 240
See application file for complete search history.

(56) References Cited

U.S. PATENT DOCUMENTS

| 5,197,143 | A | 3/1993 | Lary et al. | |
|---|---|---|---|---|
| 6,502,154 | B1 * | 12/2002 | Meredith | G06F 13/4059 370/402 |
| 2004/0205267 | A1 * | 10/2004 | Holm | G06F 13/4036 710/35 |
| 2006/0002412 | A1 | 1/2006 | Bose et al. | |
| 2009/0216933 | A1 | 8/2009 | Dunn et al. | |

FOREIGN PATENT DOCUMENTS

JP    11167546       6/1999
WO    WO-2005031506  4/2005

OTHER PUBLICATIONS

International Search Report and Written Opinion for Application No. PCT/US2011/06018 dated Jul. 31, 2012, 6 pages.

* cited by examiner

*Primary Examiner* — Glenn A Auve
(74) *Attorney, Agent, or Firm* — Blakely, Sokoloff, Taylor & Zafman LLP

(57) ABSTRACT

In accordance with embodiments disclosed herein are mechanisms for enabling multiple bus master engines to share the same request channel to a pipelined backbone including: receiving a plurality of unarbitrated grant requests at an agent bus interface from a plurality of masters, each requesting access to a backbone connected via a common request channel; determining which of the unarbitrated grant requests is to issue first as a final grant request; storing a master identifier code for the final grant request into a FIFO buffer, the master identifier code associating the final grant request with the issuing master among the plurality of masters; waiting for a backbone grant; and presenting the master identifier code for the final grant request to an agent bus interface, wherein the agent bus interface communicates a command and data for processing via a backbone responsive to the backbone grant to fulfill the final grant request.

20 Claims, 6 Drawing Sheets

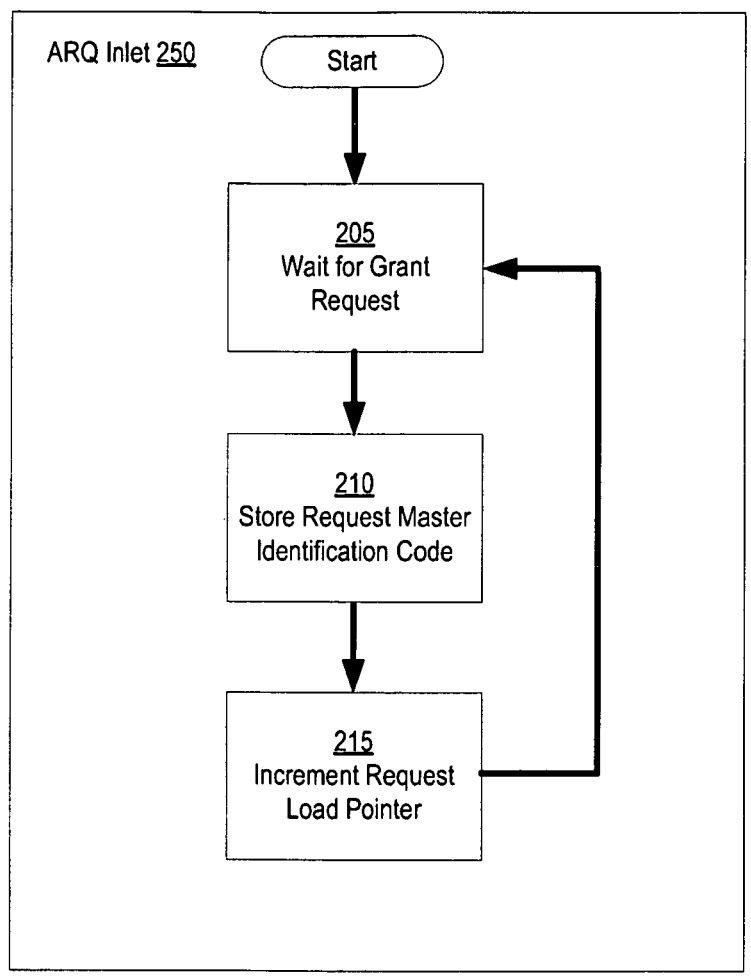

APPARATUS FOR MULTIPLE BUS MASTER ENGINES TO SHARE THE SAME REQUEST CHANNEL TO A PIPELINED BACKBONE

CLAIM OF PRIORITY

This application is a U.S. National Phase application under 35 U.S.C. §371 of International Application No. PCT/US2011/060018, filed Nov. 9, 2011, entitled APPARATUS FOR MULTIPLE BUS MASTER ENGINES TO SHARE THE SAME REQUEST CHANNEL TO A PIPELINED BACKBONE, the entire contents of which are incorporated herein by reference.

TECHNICAL FIELD

Embodiments relate generally to the field of computing, and more particularly, to enabling multiple bus master engines to share the same request channel to a pipelined backbone.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In the field of computing, systems implement pipelined backbone protocols to separate issuance of transactions by an agent. Issued transactions are typically separated into two phases: (1) requests by agent, and (2) grant by backbone. Such pipelined backbone protocols allow an agent to present multiple requests to a backbone for the same request channel, regardless of whether or not previous requests have been granted by the backbone. Grants by the backbone within the same request channel are typically required to follow the order of the request presented by the agent to the backbone. One exemplary pipelined backbone protocol is the Intel On-Chip System Fabric (IOSF).

Such pipelined backbone protocols may however become burdened from multiple request channels, each having agents issuing requests to the backbone, resulting in contention and inefficiency. Further still, ordering may become chaotic and unpredictable when multiple masters, each capable of issuing requests, are interfaced to a backbone.

The present state of the art may therefore benefit from systems, mechanisms, and methods for enabling multiple bus master engines to share the same request channel to a pipelined backbone as described herein.

BRIEF DESCRIPTION OF THE DRAWINGS

Embodiments of the present invention are illustrated by way of example, and not by way of limitation; and can be more fully understood with reference to the following detailed description when considered in connection with the figures in which:

FIG. 2A depicts an exemplary operational environment having an active request queue inlet and associated operations in accordance with disclosed embodiments;

DETAILED DESCRIPTION

Figure 1:
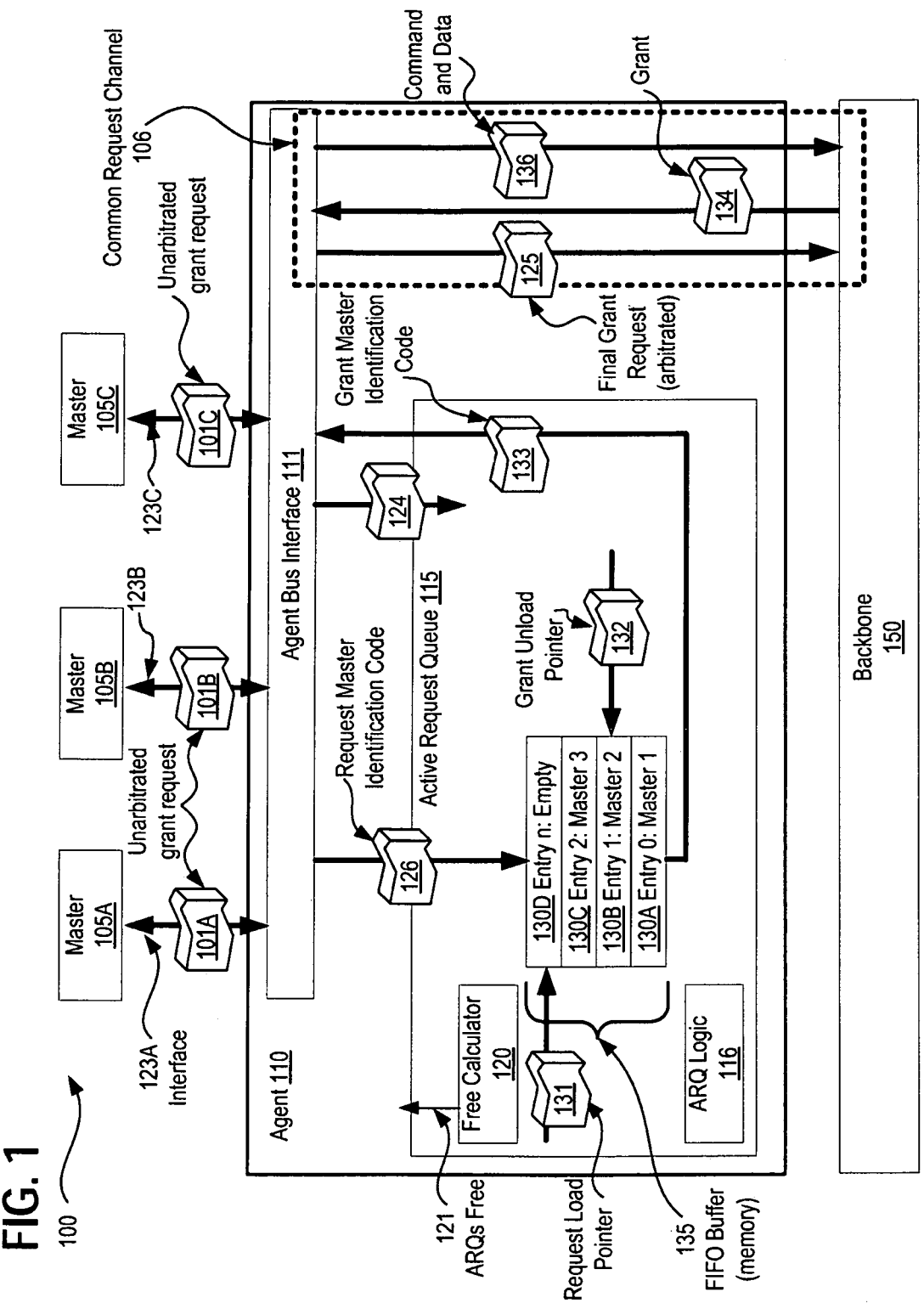
FIG. 1 depicts an exemplary active request queue structure in accordance with which embodiments may operate.

Described herein are methods, apparatuses, and systems for enabling multiple bus master engines to share the same request channel to a pipelined backbone.

In accordance with one embodiment, methods, systems, and apparatuses for enabling multiple bus master engines to share the same request channel to a pipelined backbone include, for example, receiving a plurality of unarbitrated grant requests at an agent bus interface from a plurality of masters, wherein each of the plurality of masters issue the unarbitrated grant requests requesting access to a backbone connected via a common request channel; determining which of the unarbitrated grant requests is to issue first as a final grant request; storing a master identifier code for the final grant request into a First-In-First-Out (FIFO) buffer, the master identifier code associating the final grant request with the issuing master among the plurality of masters; waiting for a backbone grant; and presenting the master identifier code for the final grant request to an agent bus interface, wherein the agent bus interface communicates a command and data for processing via a backbone responsive to the backbone grant to fulfill the final grant request. In such an embodiment, the agent bus interface performs arbitrage to select one of the possibly many incoming unarbitrated grant requests, such that a single final grant request, as selected by the arbiter, is issued to the active request queue, positioned or ordered via the queue, and then retrieved from the active request queue for processing via the backbone which is connected with the agent bus interface via a single common request channel, despite the presence of multiple masters. The unarbitrated grant requests become final grant requests subsequent to arbitrage by the agent bus interface.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary active request queue structure 100 in accordance with which embodiments may operate. Master 105A, master 105B, and master 105C are shown, each in communication with agent 110, and in particular, in communication with agent bus interface 111 via their respective interfaces 123A, 123B, and 123C. Masters 105A-C exchange requests, commands and data via the depicted interfaces 123A-C serving as a data bus for masters 105A-C. As depicted, each of the masters 105A-C communicate unarbitrated grant requests 101A, 101B, and 101C to the agent bus interface 111 of agent 110 which in turn provides arbitrage of the incoming unarbitrated grant requests 101A-C and coordinates the multiple unarbitrated grant requests 101A-C of the multiple masters 105A-C. Subsequent to arbitrage, final grant requests 125 (e.g., arbitrated grant requests) as determined and specified by the agent bus interface 111 are communicated to the backbone via the same common request channel 106, thus negating the need for implementation of separate or multiple channels to serve as interfaces for each of the multiple masters 105A-C.

The internal bus master engines, e.g., masters 105A-C, operate in conjunction with the agent 110 which faces or is communicatively interfaced with backbone 150 (e.g., a pipelined backbone) via the common request channel 106. The masters 105A-C share or are enabled to share the same common request channel 106 by communicating their unarbitrated grant requests 101A-C to the agent bus interface 111 of agent 110, rather than directly submitting unarbitrated grant requests 101A-C to the backbone 150. Because the agent 110 acts as an intermediary between the backbone 150 and the multiple masters 105A-C, providing arbitrage and coordination of the multiple masters 105A-C on behalf of the backbone 150, the backbone 150 itself requires no special alterations or configurations and may operate fully agnostic of the presence of multiple distinct masters 105A-C.

The agent 110, via the active request queue 115, enforces ordering requirements between two or more incoming unarbitrated grant requests 101A-C specifying transactions to be communicated via the same common request channel 106 which results in a reduced gatecount burden compared to implementations which create multiple request channels for each master 105A-C.

The multiple masters 105A-C each solicit attention from the backbone 150, but must first communicate through the agent bus interface 111 which conducts arbitrage on behalf of the common request channel 106. The agent bus interface 111 selects one of multiple incoming unarbitrated grant requests 101A-C and responsively identifies a final grant request 125 and generates a request master identification code 126. The request master identification code 126 is passed to the active request queue 115. The final grant request 125 is issued to the backbone 150 via the common request channel 106 on behalf of one of the interfaced masters 105A-C.

A control signal 124 communicated to the active request queue 115 instructs the active request queue to load the request master identification code 126 into the entry slots 130A-D of the FIFO buffer 135. As depicted, entry slot 0 at 130A is associated with a request from master 1 (e.g., 105A), entry slot 1 130B is associated with a request from master 2 (e.g., 105B), entry slot 2 130C is associated with a request from master 3 (e.g., 105C), and entry slot n 130D remains empty and is not associated with any of the multiple masters 105A-C.

The request master identification code 126 is stored into the FIFO buffer 135 when the final grant request 125 is granted by the arbiter function of the agent bus interface 111 having determined which of the many incoming unarbitrated grant requests 101A-C from the multiple masters is selected as a first or next request to be allowed, the allowed request determined by arbitrage among the multiple unarbitrated grant requests 101A-C becoming the final grant request 125.

At element 131, a Request Load Pointer is directed toward the presently empty slot n at element 130D, for example, to take a position in one of the slots 130A-D of the active request queue 115. At element 132, a Grant Unload Pointer is directed toward entry slot 1 at element 130B, associated with master 2 (e.g., 105B) from which a Grant Master Identification Code 133 is directed from and communicated back to the agent bus interface 111. Additionally depicted is a Grant at element 134 being communicated from the backbone 150 back to the agent bus interface 111. Responsive to a Grant 134, and in conjunction with the Grant Master Identification Code 133, agent bus interface 111 communicates, via the common request channel 106, a command and data 136 to the backbone 150 for processing. The command and data 136 are correlated with the appropriate master's 105A-C final grant request 125 using the Grant Master Identification Code 133 returned to the agent bus interface 111 responsive to a Grant 134. In one embodiment, ARQ logic 116 (e.g., implementing logic on behalf of active request queue 115) programmatically implements the above functions on behalf of agent 110.

Free calculator 120 computes and maintains a count of available ARQ resources, for example, free entry slots among 130A-D, and when necessary, ARQs free at element 121 is communicated from the free calculator 120 of the active request queue 115 to the agent 110 or agent bus interface 111.

In accordance with the disclosed embodiments, the active request queue 115 enforces a rule that a Grant 134 from backbone 150 (e.g., a backbone grant) must follow the order of final grant requests 125, as such final grant requests 125 are presented by the agent bus interface 111 to the backbone 150. Stated differently the active request queue 115 through the use of the entry slots 130A-D forces ordering of Grants 134 to follow the same order of presentment via final grant requests 125, regardless of which master 105A-C originates or issues the incoming unarbitrated grant request 101A-C resulting in a final grant request 125. Such a scheme thus permits multiple masters 105A-C to be present and to each issue the unarbitrated grant requests 101A-C to the agent 110 and its agent bus interface 111, which in turn determines the final grant requests 125 via arbitrage and the order in which the final grant requests 125 are to be communicated to the backbone 150 via the common request channel 106, without requiring the implementation of multiple channels to serve each of respective masters 105A-C individually. Such a scheme further reduces gatecount burdens in comparison to a multi-channel approach because every channel typically needs buffering of information of the transaction that needs attention from backbone 150. However, using the arbitrage mechanism as disclosed herein, the backbone 150 is not burdened by the need to buffer information on behalf of multiple channels.

The Active Request Queue (ARQ) 115 implements a First-In-First-Out buffer (FIFO buffer) 135 in a memory via the entry slots 130A-D to track the backbone's 150 grant sequence of final grant requests 125 arriving from the multiple masters 105A-C as unarbitrated grant requests 101A-C. The ARQ 115 performs the role of keeping track of which master (e.g., which one of the multiple masters 105A-C) the backbone is presently asserting a Grant 134 for, thus enabling sharing of the same common request channel 106 among the multiple masters 105A-C.

The agent bus interface 111 interfaces with all of the available masters 105A-C by providing services, such as arbitrating the various masters' 105A-C incoming unarbitrated grant requests 101A-C on behalf of Agent 110. The agent bus interface 111 further controls the command and data transfer operation of the masters 105A-C as each of the masters communicates with the agent bus interface 111 requesting access to the backbone 150 via the common request channel 106.

The agent bus interface further interfaces with the backbone 150 in terms of the request, command and data transfers. The agent bus interface thus provides an Active Request Queue Interface Inlet (ARQ Inlet) as depicted in further detail at FIG. 2A. The active request queue 115 interacts with the ARQ inlet and provides information to the ARQ inlet such as a control signal 124 to load a request master identification code 126 into the FIFO buffer 135 as a result of an unarbitrated grant request 101A-C being allowed/issued by as a final grant request 125 by the agent bus interface 111.

The backbone 150 consumes transactions (e.g., final grant requests 125 for which request master identification codes 126 are stored in the FIFO buffer 135) by asserting a Grant 134. The active request queue 115 utilizes a write port into the FIFO buffer 135 and a read port from the FIFO buffer 135 as depicted by the arrow directing the control signal 124 to load request master identification codes 126 into the FIFO buffer 135 and to read corresponding Grant Master Identification Codes 133 from the FIFO buffer 135 as depicted by the arrow exiting the FIFO buffer 135. The active request queue 115 implements a Request Load Pointer 131 operation to track each transaction's final grant request 125 that has been presented to the backbone 150 via the active request queue 115. The active request queue 115 further implements an unload pointer via the Grant Unload Pointer 132 operation to track Grants 134 by the backbone 150.

The ARQ Free Calculator 120 indicates whether the active request queue 115 is free and able to take in new final grant requests 125 from the agent request interface 111 arbitrating the unarbitrated grant requests 101A-C from masters 105A-C. The free calculator 120 compares Request Load Pointer 131 and Grant Unload Pointer 132 to determine whether there is any entry slot (e.g., one of 130A-D, such as presently empty entry slot n 130D) that does not have an outstanding final grant request 125 for the backbone. When at least one empty slot is present (e.g., empty slot 130D), the active request queue 115 is able to take in new or additional final grant requests 125 (e.g., as directed by control signal 124 from the agent bus interface 111).

Thus, in accordance with one embodiment, an agent bus interface 111 receives a plurality of unarbitrated grant requests 101A-C from a plurality of masters 105A-C, in which each of the plurality of masters 105A-C issue the unarbitrated grant requests 101A-C which request access to a backbone 150 connected via a common request channel 106. In such an embodiment, the agent bus interface 111 determines which of the unarbitrated grant requests 101A-C is to issue first as a final grant request 125 and stores a master identifier code (initially a request master identification code 126) for the final grant request into a First-In-First-Out (FIFO) buffer 135, the request master identifier code 126 associating the final grant request 125 with the issuing master among the plurality of masters 105A-C. In this embodiment, the agent bus interface 111 waits for a backbone grant 134 and presents the master identifier code (now grant master identification code 133) for the final grant request to an agent bus interface, wherein the agent bus interface communicates a command and data for processing via the backbone 150 responsive to the backbone grant 134 to fulfill the final grant request 125.

In one embodiment, the agent bus interface 111 determines which of the unarbitrated grant requests 101A-C is to issue first as a final grant request 125 by arbitrating the plurality of unarbitrated grant requests 10A-C received at the agent bus interface 111 from the plurality of masters 105A-C. In such an embodiment, each unarbitrated grant request 101A-C is issued as a final grant request 125 by the agent bus interface 111 in an order determined by the agent bus interface 111 as a result of arbitrage for the plurality of unarbitrated grant requests 101A-C received.

In one embodiment, the agent bus interface 111 further determines which of a remaining one or more of the plurality of unarbitrated grant requests 101A-C is to issue second as a second final grant request 125. In such an embodiment, an active request queue 115 which is communicatively interfaced with the agent bus interface 111 writes the master identifier code (here the request master identification code 126) into the entry 130A-D of FIFO buffer 135 pointed to by a request load pointer 131 for each of the first final grant request and the second final grant request in the order in which the first and second final grant requests 125 are received. In such an embodiment, the agent bus interface 111 issues the first final grant request 125 from a first master 105A-C onto the common request channel 106. In such an embodiment, the agent bus interface 111 further issues the second final grant request 125 from a second master 105A-C onto the common request channel 106. In such an embodiment, the first final grant request 125 and the second final grant request 125 are issued onto the common request channel 106 to be processed via the backbone 150 in the order in which the request master identification codes 126 corresponding to the first and second final grant requests 125 are written into the FIFO buffer.

In one embodiment, the active request queue 115 receives the issued first final grant request 125 and the issued second final grant request 125 via the agent bus interface 111 and the active request queue 115 forces the first final grant request 125 and the second final grant request 125 to be processed via the backbone 150 in the order the first and second final grant requests 125 are received by the active request queue 115.

Stated differently, all masters 105A-C will issue a separate unarbitrated grant request 101A-C through their respective interface 123A-C. Agent bus interface 111 selects one of the many incoming unarbitrated grant requests 101A-C to be presented to backbone 150, in which the selected one unarbitrated grant requests 101A-C is a final grant request 125 as a result of arbitrage by the agent bus interface. It is that final grant request 125 which is then presented to the backbone 125. Thus, a first and second final grant request 125 represents two final grant requests 125 which have successfully been selected (e.g., arbitrated) by the agent bus interface 111 and may now be presented to the backbone 150 in a coordinated manner.

In accordance with one embodiment, the agent bus interface 111 communicates the final grant requests 125 onto the common request channel 106 for processing via the backbone 150 subsequent to conducting arbitrage on behalf of the multiple masters 105A-C, so as to select only one unarbitrated grant request 101A-C as a final grant request 125 to be passed to the backbone 150 via the common request channel 106 on behalf of one of the masters 105A-C. In such an embodiment, the agent bus interface 111 receives the unarbitrated grant requests 101A-C from masters 105A-C selected from the group of masters including (1) a PCI Express attached device issuing one of the plurality of unarbitrated grant requests 101A-C; (2) a serial ATA attached device issuing one of the plurality of unarbitrated grant requests 101A-C; (3) a Platform Controller Hub attached device issuing one of the plurality of unarbitrated grant requests 101A-C; and (4) a Direct Media Interface (DMI) attached device issuing one of the plurality of unarbitrated grant requests 101A-C.

In one embodiment, the FIFO buffer 135 is implemented into a memory and the FIFO buffer 135 is structured with a plurality of entry slots 130A-D, in which each of the plurality of entry slots 130A-D stores a request master identification code 126 identifying the issuing master 105A-C of a final grant request 125 among the plurality of masters. Storing the request master identifier code 126 may include writing the request master identifier code 126 into one of a plurality of entry slots 130A-D in the FIFO buffer 135 and responsively incrementing a Request Load Pointer 131 to cause the Request Load Pointer 131 to point to a next one of the plurality of entry slots 130A-D in the FIFO buffer 135.

In one embodiment, the active request queue 115 reads the granted master identification code 133 (corresponding to a request master identification code 126) from one of a plurality of entry slots 130A-D in the FIFO buffer 135 responsive to receiving the backbone Grant 134 and responsively increments a Grant Unload Pointer 132 to cause the Grant Unload Pointer 132 to point to a next populated one of the plurality of entry slots 130A-D in the FIFO buffer 135.

In one embodiment, an ARQ Free calculator 120 determines whether the FIFO buffer 135 has an empty entry slot (e.g., 130D) capable to receive and buffer a new final grant request 125 having been arbitrated by the agent bus interface 111. In such an embodiment, the active request queue 115 stores the request master identifier code 126 into the FIFO buffer 135 and into the empty slot 130D of the FIFO buffer when the FIFO buffer 135 is determined to have the empty slot 130D.

In one embodiment, the agent bus interface 111 determines which issuing master among the plurality of masters 105A-C corresponds to the grant master identification code 133 for the backbone Grant 134 presented to the agent bus interface 111 from the active request queue. The agent bus interface 111 retrieves the command and the data 136 responsive to the backbone Grant 134 and communicates the command and the data 136 to the backbone 150 for processing. The command and data 136 is being communicated to the backbone 150 via the common request channel 106.

FIG. 2A depicts an exemplary operational environment 200 having an active request queue inlet 250 and associated operations 205, 210, and 215, in accordance with disclosed embodiments.

ARQ inlet 250 implements a series of operations beginning with the Wait for Grant Request 205 operation which awaits receipt of a final grant request 125 from the agent bus interface 111 as depicted at FIG. 1, the final grant request 125 resulting from the selection and determining of one of multiple unarbitrated grant requests 101A-C received and arbitrated by the agent bus interface 111.

Flow then proceeds to the Store Request Master Identification Code 210 operation to store the request master identification code 126 as depicted at FIG. 1. Flow then proceeds to the Increment Request Load Pointer 215 operation which increments the Request Load Pointer 131 depicted at FIG. 1. When a final grant request is received at operation 205 (e.g., grant request 125 from FIG. 1), the ARQ inlet 250 responsively stores the identification code of the master (e.g., one of 105A-C) that has its unarbitrated grant request 101A-C allowed as final grant request 125. The identification code of the master is stored into the entry slot (e.g. one of 130A-D) which is pointed to by Request Load Pointer 131. The Request Load Pointer 131 is then incremented and flow returns to 205 within the ARQ inlet 250 to process or wait for a new final grant request 125.

Figure 2B:
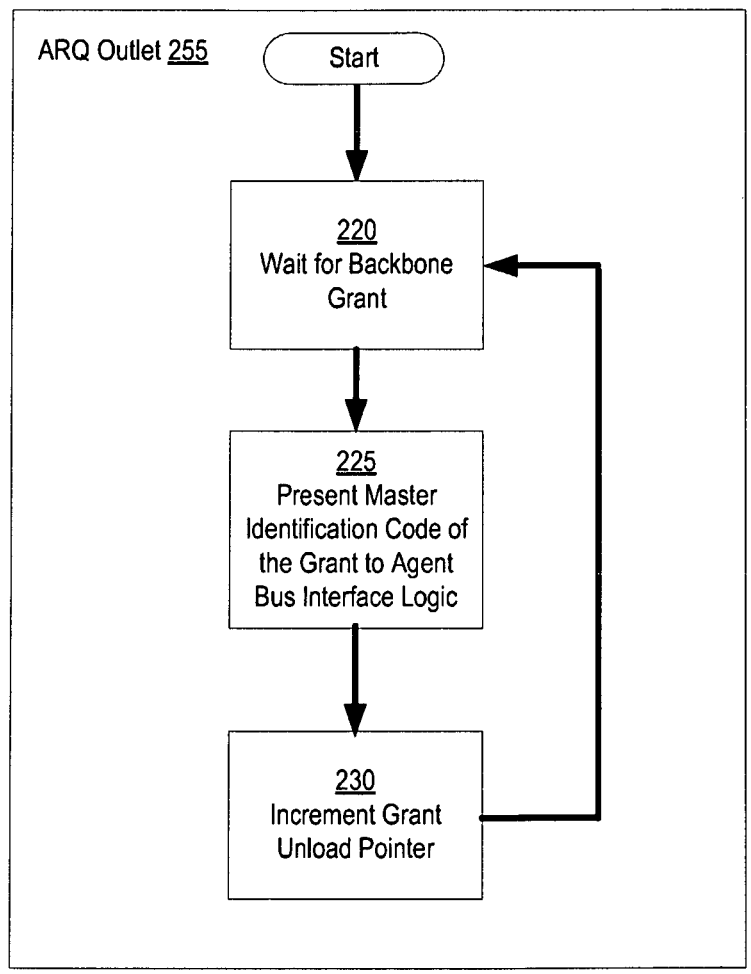
FIG. 2B depicts an exemplary operational environment having an active request queue outlet and associated operations in accordance with disclosed embodiments.

FIG. 2B depicts an exemplary operational environment 201 having an active request queue outlet 255 and associated operations 220, 225, and 230, in accordance with disclosed embodiments.

ARQ outlet 255 implements a series of operations beginning with the Wait for Backbone Grant 220 operation to await a Grant 134 from the backbone 150 as depicted by FIG. 1. Flow then proceeds to the Present Master Identification Code of the Grant to Agent Bus Interface Logic 225 operation for presentment of the grant master identification code 133 as read from the slot 130A-D pointed to by the grant unload pointer 132. Flow then proceeds to the Increment Grant Unload Pointer 230 operation which increments the Grant Unload Pointer 132 as depicted at FIG. 1.

When there is a Backbone Grant 134, the ARQ outlet operation 225 presents the Master Identification Code pointed to by Grant Unload Pointer 132 which corresponds to the Backbone Grant 134. The Request Master Identification Code 126 was previously stored by operation 210 of the ARQ inlet 250 operational flow. The Grant Master Identification Code 133 is used by the agent bus interface 111 to determine which master's (e.g., which one of masters 105A-C) command and data need to be presented to backbone 150 for transactional fulfillment. Operation 230 then increments the Grant Unload Pointer 132 and advances the flow of the ARQ outlet 255 back to operation 220 to process or await a new Backbone Grant (e.g., Grant 134).

Implementation of the active request queue 115 and associated operations 205-230 support master sharing of a common request channel 106 with flexibility to add various other features. For example, in a PCI Express (Peripheral Component Interconnect Express) implementation, the active request queue 115 may be utilized to share a common request channel 106 between two masters issuing transactional unarbitrated grant requests 101A-C which are arbitrated and allowed as final grant requests 125 for fulfillment via the backbone 150 connected via a single common request channel 106, while still permitting beneficial pipelined backbone capabilities. Moreover, implementation of the active request queue 115 enables transaction splitting storage capability. Splitting storage capability is an expansion of the ARQ's FIFO buffer 135 width to contain a split transaction's address and length information so as to enable a timing friendly design.

Implementation of the active request queue 115 and associated operations 205-230 in a Serial-ATA environment enables sharing of a common request channel 106 between two or more masters (e.g., 105A-C from FIG. 1). Implementation of the active request queue 115 is especially useful to a Serial ATA (SATA or Serial Advanced Technology Attachment) implementation which: (a) lacks native support for sharing a common request channel between two or more masters, (b) lacks native implementation or utilization of pipelined backbone capability, and/or (c) lacks native support for transaction splitting storage capability.

Through practice of the disclosed embodiments, any number of masters 105A-C are enabled to share a single common request channel 106 to a pipelined backbone 150. Further still, practice of the disclosed embodiments enables support for any number of pipelines which are supported by the underlying backbone 150, regardless of whether or not the agent bus interface 111 natively implements or supports pipelining, because the active request queue 115 serves as an intermediary to accept unarbitrated grant requests 101A-C without requiring any special capability or implementation by the agent bus interface 111, besides the fundamental function of issuing or presenting the unarbitrated grant requests 101A-C. Therefore, any black-box agent bus interface 111 solution can be utilized, and the benefits of the disclosed active request queue 115 will still be realized.

As noted above, practice of the disclosed embodiments is scalable to store commands, if needed, especially when an agent bus interface 111 is splitting a transaction (e.g., splitting a grant request 125 into sub-parts). The ability to support command storage permits a timing friendly design, and thus, a more efficient (e.g., faster and less resource intensive) implementation.

The disclosed embodiments scale to work with multiple backbone grant requirements simply by adding additional unload pointers, such as the Grant Unload Pointer 132 depicted at FIG. 1. For instance, IOSF defines a show grant operation to show commands for target decode schemes and a transaction grant operation to transfer command. The active request queue 115 therefore enables support for any kind of decode mechanism that a backbone 150 uses through the addition of such unload pointers. Supported decode mechanism may therefore include, for example: (a) Target decode, to generate show and transaction grants; or (b) Fabric or Source decode, to generate only transaction grants.

Practice of the disclosed embodiments may therefore provide operational benefit to implementations such as Platform Controller Hubs for use in mobile, desktop and server systems, Direct Media Interface (DMI) implementations, PCI Express and Serial-ATA implementations, etc.

Practice of the disclosed embodiments eliminates the need to implement more complex solutions, such as a time sharing or multiplexing scheme, for example, in which ownership of a common request channel is assigned to one of multiple masters for a period of time, and then rotated on an ongoing basis, and has the added benefit of leaving the common request channel accessible to all masters at any given time, without violating grant ordering from the backbone. As noted above, practice of the disclosed embodiments additionally eliminates a more costly construction of one channel per master type solution.

Additionally, pipeline behavior on the backbone 150 can be controlled by sizing the queue depth accordingly, for example, by increasing the memory footprint upon which the FIFO buffer 135 and entry slots 130A-D are implemented. For example, sizing to a 1-deep queue will accommodate devices that strictly require a non-pipelined operational mode.

Figure 3:
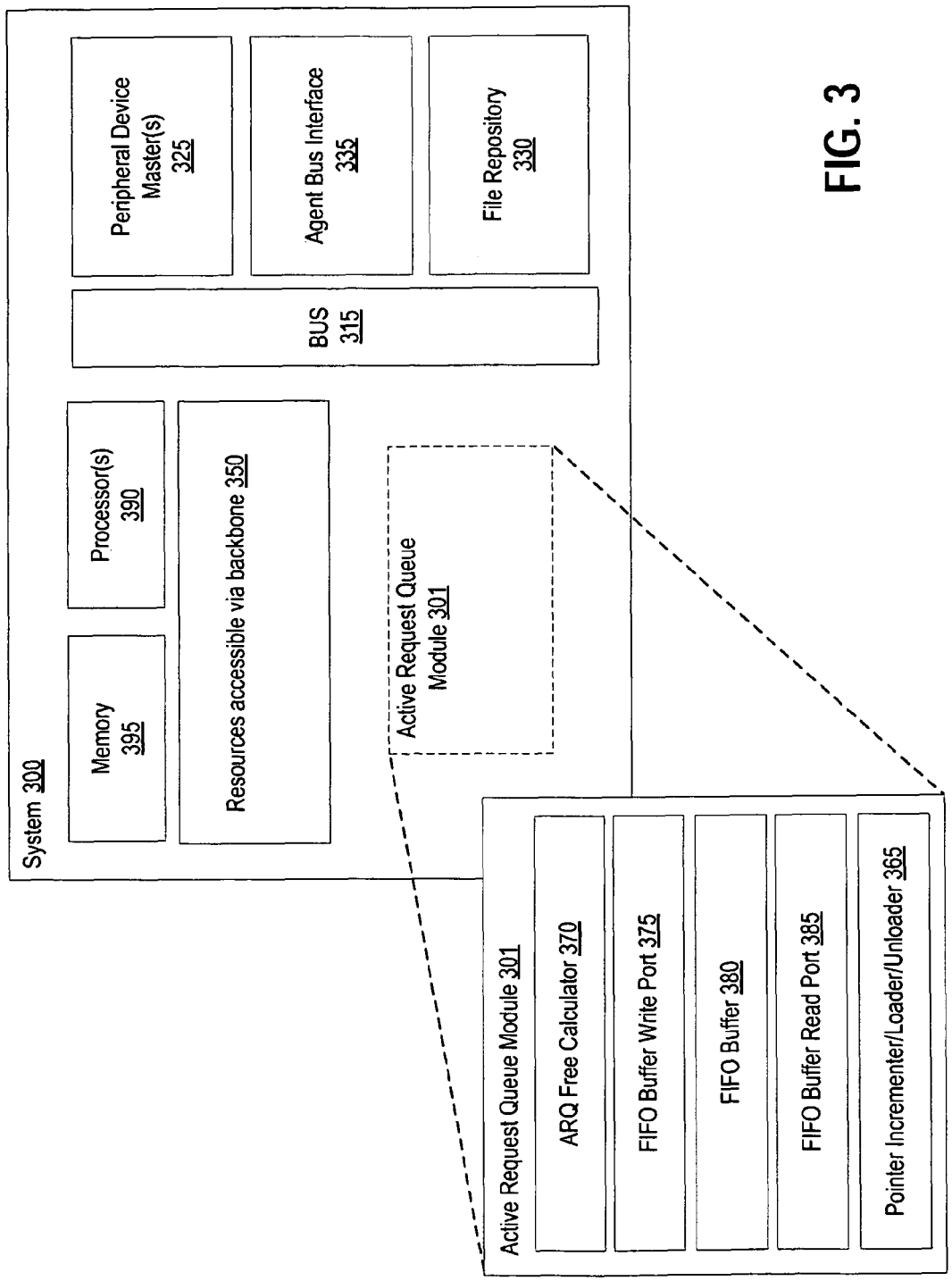
FIG. 3 shows a diagrammatic representation of a system in which embodiments may operate, be installed, integrated, or configured, in accordance with one embodiment.

FIG. 3 shows a diagrammatic representation of a system 300 in which embodiments may operate, be installed, integrated, or configured, in accordance with one embodiment.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes peripheral devices and master(s) 325, for example, to issue requests and transactions to a backbone. Multiple peripheral devices, each having one or more masters, or a single peripheral device with multiple masters may be present, each issuing requests to a backbone, in accordance with the disclosed embodiments.

The peripheral device master(s) 325 issue unarbitrated grant requests to an agent bus interface 335 of the system 300 for arbitration. Requests from the peripheral device master(s) may specify resources available via the common request channel to the backbone 350.

File repository 330 provides storage as necessary for the system 300, for example, to store defined instructions, business logic, implementing logic for the system 300, etc.

Distinct within system 300 is an active request queue module 301 which includes ARQ free calculator 370, a FIFO buffer write port 375, a FIFO buffer 380, for example, implemented in a memory, a FIFO buffer read port 385, and a pointer Incrementer/Loader/Unloader 365. Any or all of the components of the active request queue module 301 may be hardware based, such that each is enabled by the hardware of system 300 in conjunction with the system 300's processor(s) 390 and memory 395 to carry out the described capabilities. In accordance with one embodiment, ARQ free calculator 370 determines whether a slot is free within FIFO buffer 380 such that the active request module 301 is capable of receiving a new final grant request having been selected from multiple unarbitrated grant requests by the agent bus interface. The FIFO write buffer port 375 writes new final grant requests into the FIFO buffer 380. The FIFO buffer 380 implements a first-in-first-out buffer for multiple final grant requests having been arbitrated and selected by the agent bus interface from multiple unarbitrated grant requests originating from multiple different masters, such as peripheral device master(s) 325. The FIFO buffer read port 385 reads grant master identification codes for final grant requests out of the FIFO buffer 380. Element 365 provides a pointer incrementer, a pointer loader, and a pointer unloader, for transacting with the FIFO buffer 380. For example, to store and retrieve request master identification codes 126 and grant master identification code 133 as necessary for correlating requests and grants with the appropriate one of a multitude of masters which are issuing the unarbitrated grant requests to the agent bus interface for arbitrage.

In one embodiment, an apparatus such as the active request queue module 301 includes a memory having a First-In-First-Out (FIFO) buffer, the FIFO buffer having a plurality of entry slots. Such an apparatus further includes a FIFO buffer write port to write a master identifier code into an empty slot of the FIFO buffer responsive to the apparatus receiving an unarbitrated grant request for communication to a backbone via a common request channel, the received grant request from one of a plurality of masters communicatively interfaced with the apparatus, and in which each of the plurality of masters issue unarbitrated grant requests for communication to the backbone. The apparatus further includes a FIFO buffer read port to read the master identifier code from the FIFO buffer. The apparatus further includes active request queue logic to present the master identifier code to the agent bus interface to cause the agent bus interface to communicate, via the common request channel, a command and data to a backbone for processing.

In one embodiment, a pointer incrementer 365 increments a Request Load Pointer to cause the Request Load Pointer to point to a next one of the plurality of entry slots in the FIFO buffer 380 subsequent to the FIFO write port 375 writing the request master identifier code into the empty slot of the FIFO buffer 380. The pointer incrementer 365 may further increment a Grant Unload Pointer to cause the Grant Unload Pointer to point to a next populated one of the plurality of entry slots in the FIFO buffer 380 subsequent to the FIFO read port 385 reading the request master identifier code from the FIFO buffer 380.

An ARQ Free calculator 370 of such an apparatus determines whether the FIFO buffer 380 has an empty entry slot capable to receive and buffer a new grant request.

In one embodiment, a system implements an active request queue. For example, in accordance with one embodiment, such a system includes a display (e.g., such as user interface 510 at FIG. 5) and further includes an agent bus interface 335 and an active request queue or an active request queue module 301 which is communicatively interfaced with the agent bus interface. In such an embodiment, the active request queue of the system includes a memory having a First-In-First-Out (FIFO) buffer, the FIFO buffer having a plurality of entry slots; a FIFO buffer write port to write a master identifier code into an empty slot of the FIFO buffer responsive to the apparatus receiving an unarbitrated grant request for communication to a backbone via a common request channel, the received grant request from one of a plurality of masters communicatively interfaced with the apparatus, and wherein each of the plurality of masters issue unarbitrated grant requests for communication to the backbone; a FIFO buffer read port to read the master identifier code from the FIFO buffer responsive to receiving a backbone grant; and active request queue logic to present the master identifier code to the agent bus interface to cause the agent bus interface to communicate, via the common request channel, a command and data to a backbone for processing.

The agent bus interface 335 of such a system may receive the unarbitrated grant request and to communicate the final grant request to the active request queue subsequent to arbitrage. For example, the agent bus interface 335 selecting one of many unarbitrated grant requests as an allowed, arbitrated, and thus final grant request.

Figure 4:
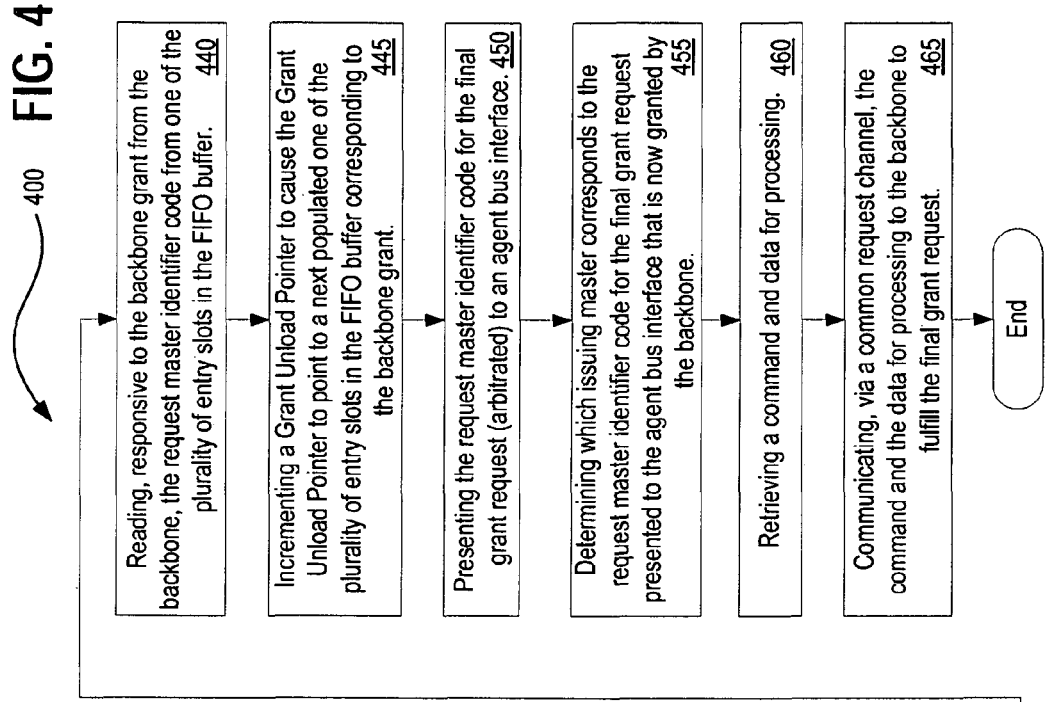
FIG. 4 is a flow diagram illustrating a method for enabling multiple bus master engines to share the same request channel to a pipelined backbone in accordance with one embodiment.
Figure 4:
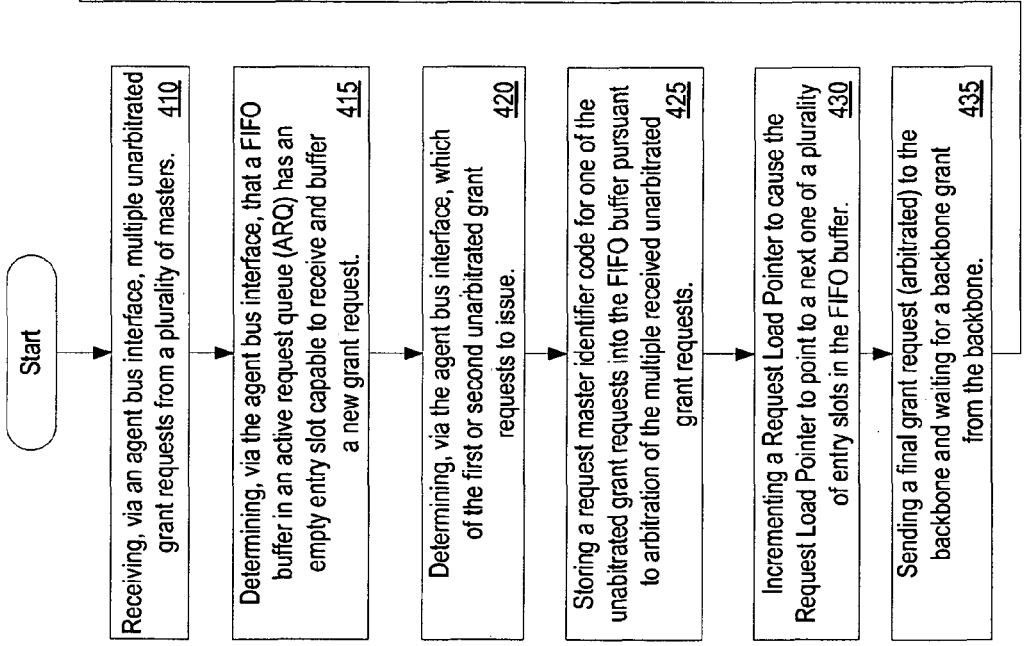

FIG. 4 is a flow diagram illustrating a method 400 for enabling multiple bus master engines to share the same common request channel to a pipelined backbone in accordance with disclosed embodiments, including having multiple masters to issue requests, queuing such request, correlating requests for grant to an issuing master for the request, and facilitating grant and presentment of requests for transacting with underlying resources available via a backbone, in which communication between an agent bus interface and the backbone is conducted via a common request channel on behalf of multiple masters. Method 400 may be performed by processing logic that may include hardware (e.g., circuitry, dedicated logic, programmable logic, microcode, etc.), software (e.g., instructions run on a processing device to perform various operations such communicating requests, grants, master identification codes, etc.), in pursuance of enabling multiple bus master engines to share the same common request channel to a pipelined backbone. In one embodiment, method 400 is performed by a hardware based system, such as system 300 set forth at FIG. 3. Some operations may be performed by an active request queue module 301 as that which is shown within system 300 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic in an agent bus interface receiving, via an agent bus interface, multiple unarbitrated grant requests from a plurality of masters. (block 410). For example, the agent bus interface receives multiple incoming and unarbitrated grant requests, and arbitrates many requests from the multiple masters, each requesting access to resources via the backbone connected via a common request channel. Where multiple unarbitrated grant requests are received, the agent bus interface determines which to allow first, and then second, third, and so forth.

At block 415, processing logic in the agent bus interface determines that a FIFO buffer in an active request queue (ARQ) has an empty entry slot capable to receive and buffer a new grant request. For example, an empty entry slot capable of receiving or loading a new incoming request master identification code.

At block 420, processing logic in the agent bus interface determines, via the agent bus interface, which of the first or second unarbitrated grant requests to issue.

At block 425, processing logic in the active request queue stores a request master identifier code for one of the unarbitrated grant requests into the FIFO buffer pursuant to arbitration of the multiple received unarbitrated grant requests.

At block 430, processing logic increments a Request Load Pointer to cause the Request Load Pointer to point to a next one of a plurality of entry slots in the FIFO buffer.

At block 435, processing logic sends a final grant request (arbitrated) to the backbone and waits for a backbone grant from a backbone.

At block 440, responsive to the backbone grant from the backbone, processing logic reads the request master identifier code from one of the plurality of entry slots in the FIFO buffer.

At block 445, processing logic increments a Grant Unload Pointer to cause the Grant Unload Pointer to point to a next populated one of the plurality of entry slots in the FIFO buffer.

At block 450, processing logic presents the request master identifier code for the final grant request to an agent bus interface corresponding to the backbone grant.

At block 455, processing logic determines which issuing master corresponds to the request master identifier code for the final grant request (arbitrated) presented to the agent bus interface that is now granted by the backbone.

At block 460, processing logic retrieves a command and data for processing.

At block 465, processing logic communicates, via a common request channel, the command and the data for processing to the backbone to fulfill the final grant request.

Figure 5:
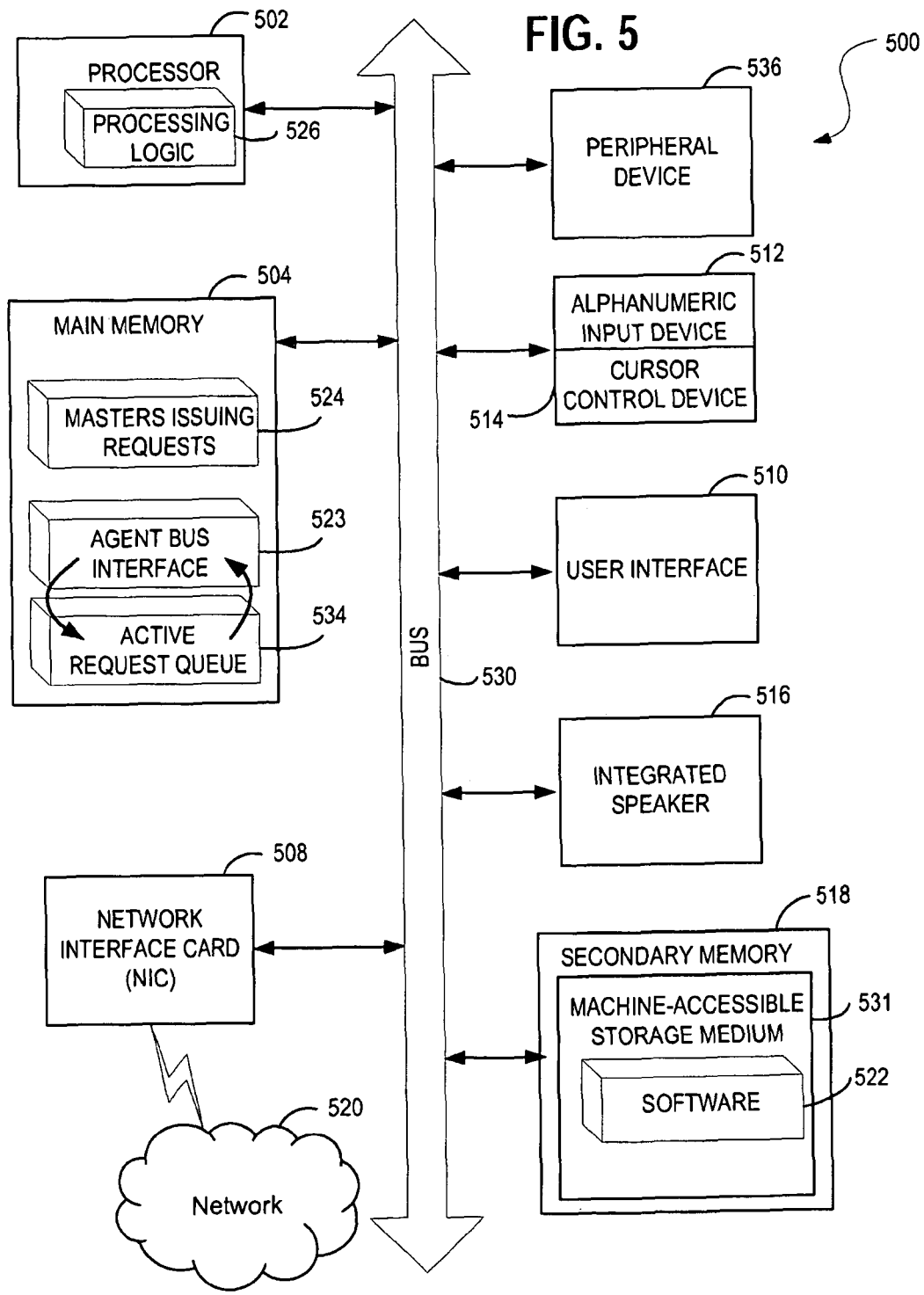
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drive), which communicate with each other via a bus 530. Main memory 504 includes multiple masters 524 issuing unarbitrated grant requests, for example, requesting transactions or resources available via a backbone which is connected via a common request channel. Main memory 504 further includes an agent bus interface 523 for receiving the multiple unarbitrated grant requests which operates cooperatively with the active request queue 534. Main memory 504 and its sub-elements (e.g. 523, 524, and 534) are operable in conjunction with processing logic 526 and processor 502 to perform the methodologies discussed herein. The masters issuing unarbitrated grant requests may alternatively or additionally reside within, for example, peripheral device(s) 536.

Processor 502 represents one or more general-purpose processing devices such as a microprocessor, central processing unit, or, the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   receiving a plurality of unarbitrated grant requests at an agent bus interface from a plurality of masters, wherein each of the plurality of masters issue the unarbitrated grant requests requesting access to a backbone connected via a common request channel;
   determining which of the unarbitrated grant requests is to issue first as a final grant request;
   storing a master identifier code for the final grant request into a First-In-First-Out (FIFO) buffer, the master identifier code associating the final grant request with the issuing master among the plurality of masters;
   waiting for a backbone grant; and
   presenting the master identifier code for the final grant request to the agent bus interface, wherein the agent bus interface communicates a command and data for processing via the backbone responsive to the backbone grant to fulfill the final grant request.

2. The method of claim 1:
   wherein determining which of the unarbitrated grant requests is to issue first as a final grant request comprises arbitrating the plurality of unarbitrated grant requests received at the agent bus interface from the plurality of masters; and
   wherein each unarbitrated grant request is issued as a final grant request by the agent bus interface in an order determined by the agent bus interface as a result of arbitrage for the plurality of unarbitrated grant requests received.

3. The method of claim 1, further comprising:
determining which of a remaining one or more of the plurality of unarbitrated grant requests is to issue second as a second final grant request;
writing the master identifier code into the entry of FIFO buffer pointed to by a request load pointer for each of the first final grant request and the second final grant request in the order in which the first and second final grant requests are received;
issuing, via an agent bus interface, the first final grant request from a first master onto the common request channel;
issuing, via the agent bus interface, the second final grant request from a second master onto the common request channel; and
wherein the first final grant request and the second final grant request are issued onto the common request channel to be processed via the backbone in the order in which the request master identification codes corresponding to the first and second final grant requests are written into the FIFO buffer.

4. The method of claim 3:
wherein an active request queue receives the issued first final grant request and the issued second final grant request via the agent bus interface; and
wherein the active request queue forces the first final grant request and the second final grant request to be processed via the backbone in the order the first and second final grant requests are received by the active request queue.

5. The method of claim 3, wherein each of the plurality of masters comprises one of:
a PCI Express attached device issuing one of the plurality of unarbitrated grant requests;
a serial ATA attached device issuing one of the plurality of unarbitrated grant requests;
a Platform Controller Hub attached device issuing one of the plurality of unarbitrated grant requests; and
a Direct Media Interface (DMI) attached device issuing one of the plurality of unarbitrated grant requests.

6. The method of claim 1, wherein the FIFO buffer comprises a memory having a plurality of entry slots, wherein each of the plurality of entry slots stores a request master identification code identifying the issuing master of an unarbitrated grant request among the plurality of masters issuing the plurality of unarbitrated grant requests.

7. The method of claim 1:
wherein storing the master identifier code for the grant request into the FIFO buffer comprises writing a request master identifier code into one of a plurality of entry slots in the FIFO buffer; and
responsively incrementing a Request Load Pointer to cause the Request Load Pointer to point to a next one of the plurality of entry slots in the FIFO buffer.

8. The method of claim 7, further comprising:
reading a grant master identification code corresponding to the request master identifier code from one of a plurality of entry slots in the FIFO buffer responsive to receiving the backbone grant; and
responsively incrementing a Grant Unload Pointer to cause the Grant Unload Pointer to point to a next populated one of the plurality of entry slots in the FIFO buffer.

9. The method of claim 1, further comprising:
determining, via an ARQ Free calculator, whether the FIFO buffer has an empty entry slot capable to receive and buffer a new final grant request issued by the agent bus interface; and wherein storing the master identifier code for the grant request into the FIFO buffer comprises storing the master identifier code into the empty slot of the FIFO buffer when the FIFO buffer is determined to have the empty slot.

10. The method of claim 1, further comprising:
determining, via the agent bus interface, which issuing master among the plurality of masters corresponds to the master identifier code for the final grant request presented to the agent bus interface;
retrieving the command and the data for processing the final grant request; and
communicating the command and the data for processing to the backbone via the common request channel.

11. An apparatus comprising:
a memory comprising a First-In-First-Out (FIFO) buffer, the FIFO buffer having a plurality of entry slots;
a FIFO buffer write port to write a master identifier code into an empty slot of the FIFO buffer responsive to the apparatus receiving an unarbitrated grant request for communication to a backbone via a common request channel, the received grant request from one of a plurality of masters communicatively interfaced with the apparatus, and wherein each of the plurality of masters issue unarbitrated grant requests for communication to the backbone;
a FIFO buffer read port to read the master identifier code from the FIFO buffer responsive to receiving a backbone grant; and
active request queue logic to present the master identifier code to an agent bus interface to cause the agent bus interface to communicate, via the common request channel, a command and data to a backbone for processing.

12. The apparatus of claim 11:
wherein the master identifier code associates the received unarbitrated grant request with the issuing master among the plurality of masters;
wherein the master identification code written into empty slot of the FIFO buffer comprises a request master identification code; and
wherein the master identification code read from the FIFO buffer comprises a grant master identification code corresponding to the request master identification code.

13. The apparatus of claim 11:
wherein the agent bus interface to determine which master among the plurality of masters issued the final grant request based on the master identifier code;
wherein the agent bus interface to retrieve the command and the data associated based on which master among the plurality of masters issued the final grant request; and
wherein the agent bus interface to communicate, via the common request channel, the command and the data for processing via the backbone responsive to the backbone grant to fulfill the final grant request.

14. The apparatus of claim 11, further comprising:
a pointer incrementer to increment a Request Load Pointer to cause the Request Load Pointer to point to a next one of the plurality of entry slots in the FIFO buffer subsequent to the FIFO write port writing the master identifier code into the empty slot of the FIFO buffer.

15. The apparatus of claim 14, further comprising:
the pointer incrementer to increment a Grant Unload Pointer to cause the Grant Unload Pointer to point to a next populated one of the plurality of entry slots in the FIFO buffer subsequent to the FIFO read port reading the master identifier code from the FIFO buffer.

16. The apparatus of claim 11, further comprising:
an ARQ Free calculator to determine whether the FIFO buffer has an empty entry slot capable to receive and buffer a new final grant request having been arbitrated by the agent bus interface; and
wherein the FIFO buffer write port to write the master identifier code into the empty slot of the FIFO buffer comprises the FIFO buffer write port to write the master identifier code into the empty slot when the FIFO buffer is determined by the ARQ Free calculator to have the empty slot.

17. The apparatus of claim 11:
wherein an active request queue of the apparatus is to receive the final grant request from a first master among the plurality of masters, the final grant request having been arbitrated by the agent bus interface;
wherein the active request queue of the apparatus is to receive a second final grant request from a second master among the plurality of masters, the second final grant request having been arbitrated by the agent bus interface;
wherein the FIFO buffer write port to write the master identifier code into a first empty slot of the FIFO buffer and to further write a second master identifier code into a next empty slot of the FIFO buffer; and
wherein the active request queue of the apparatus forces the first and second final grant requests to be communicated to the backbone via the common request channel and processed via the backbone in the order the first and second final grant requests are received by the active request queue.

18. A system comprising:
a display;
an agent bus interface;
an active request queue communicatively interfaced with the agent bus interface, wherein the active request queue comprises:
a memory comprising a First-In-First-Out (FIFO) buffer, the FIFO buffer having a plurality of entry slots;
a FIFO buffer write port to write a master identifier code into an empty slot of the FIFO buffer responsive to the system receiving an unarbitrated grant request for communication to a backbone via a common request channel, the received grant request from one of a plurality of masters communicatively interfaced with the system, and wherein each of the plurality of masters issue unarbitrated grant requests for communication to the backbone;
a FIFO buffer read port to read the master identifier code from the FIFO buffer responsive to receiving a backbone grant, and
active request queue logic to present the master identifier code to the agent bus interface to cause the agent bus interface to communicate, via the common request channel, a command and data to a backbone for processing.

19. The system of claim 18, further comprising:
the agent bus interface to receive the unarbitrated grant request and to communicate the final grant request to the active request queue subsequent to arbitrage.

20. The system of claim 19, further comprising:
one or more peripheral devices, each having one or more masters among the plurality of masters, wherein each of the plurality of masters issue unarbitrated grant requests to the agent bus interface requesting access to resources available via the backbone via the common request channel; and
wherein each of the one or more peripheral devices comprise one of:
a PCI Express attached device issuing the unarbitrated grant request;
a serial ATA attached device issuing the unarbitrated grant request;
a Platform Controller Hub attached device issuing the unarbitrated grant request; and
a Direct Media Interface (DMI) attached device issuing the unarbitrated grant request.

* * * * *